United States Patent [19]

Kuwahara

[11] 4,456,089

[45] Jun. 26, 1984

[54] MOTORIZED DEVICE FOR PUSHING OR PULLING A ROLLER SKATE

[76] Inventor: Akira Kuwahara, 136-66 Takayama-cho, Ikoma-shi, Nara, Japan

[21] Appl. No.: 311,871

[22] Filed: Oct. 15, 1981

[30] Foreign Application Priority Data

Oct. 17, 1980 [JP] Japan .................. 55-145927

[51] Int. Cl.³ .............................................. A63C 17/12
[52] U.S. Cl. ...................................... 180/180; 180/19.1
[58] Field of Search ........................... 180/180, 19 R

[56] References Cited

U.S. PATENT DOCUMENTS

3,797,446  3/1974  Cox et al. .......................... 180/180
4,210,217  7/1980  Lachowicz ........................ 180/19 R

FOREIGN PATENT DOCUMENTS

1169880  1/1959  France ............................ 180/180

*Primary Examiner*—David M. Mitchell
*Attorney, Agent, or Firm*—Koda and Androlia

[57] ABSTRACT

A driving vehicle by which a skater may enjoy skating by being pulled or pushed, said vehicle comprises a frame constituting a framework, a handle provided at the upper end portion of said frame, a rotary wheel means rotatably provided at the lower end portion of said frame and a prime mover mounted on one portion of said frame so as to drive said rotary wheel means, said handle is further provided with an accelerator operating portion for controlling rotational speed of said prime mover and a brake operating portion for braking said rotary wheel means.

4 Claims, 3 Drawing Figures

MOTORIZED DEVICE FOR PUSHING OR PULLING A ROLLER SKATE

BACKGROUND OF THE INVENTION

1. Field of the Invention

The present invention relates to a driving vehicle equipped with a prime mover for use in sports and games.

2. Prior Art

Conventionally, sports or games in which a player who wears a pair of skates or the like operates a driving vehicle for running have not been disclosed up to the present. Therefore, a skater can merely enjoy skating by skating with leg motion only. When a skater, especially a beginner, is pulled by someone or something, he may feel comfortable and can enjoy skating with ease. Though this has been well known, no suitable device which is able to pull a skater has been invented.

SUMMARY OF THE INVENTION

Accordingly, it is a primary object of the present invention to provide a driving vehicle having a rotary wheel means which is used, as a driving means for running, by a player wearing a pair of skates arranged to run on the ground or floor surface so that the player can enjoy running very pleasantly with great interest.

The above-mentioned features and objects of the present invention are accomplished by a unique driving vehicle which comprises a frame constituting a framework, a handle provided at the upper end portion of said frame, rotary wheel means rotatably provided at the lower end portion of said frame, and a prime mover mounted on one portion of said frame so as to drive said rotary wheel means, said handle is further provided with an accelerator operating portion for controlling the rotational speed of said prime mover and a brake operating portion for braking said rotary wheel means.

DETAILED DESCRIPTION OF THE INVENTION

Figure 1:
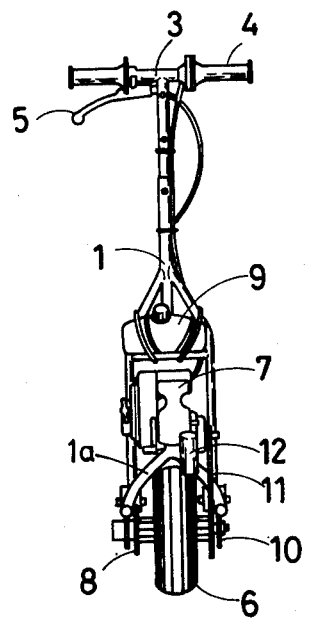
FIG. 1 is a rear elevational view of a driving vehicle equipped with a prime mover for use in sports and games according to one preferred embodiment of the present invention.

Referring now to the drawings, the present invention will be described in detail hereinbelow with reference to one preferred embodiment thereof.

The driving vehicle according to the present invention generally includes a frame 1 constituting a framework of this driving vehicle, a handle 3 horizontally provided at the upper end portion of said frame 1 which a player 2 grasps with his both hands, and an accelerator operating portion 4 and a brake operating portion 5 which are mounted on said handle 3.

In the embodiment as shown in FIG. 1, there is rotatably mounted one rotary wheel 6 on a subframe 1a which is coupled to the frame, while a prime mover 7 is also mounted on one the subframe 1a which is coupled to the frame 1, and said prime mover 7 is coupled to the rotary wheel 6 by a conventional centrifugal clutch and a chain 11 for driving said rotary wheel 6. It should be apparent from the figures that the rotary wheel 6 and subframe 1a are coupled to the frame 1 such that the rotary wheel 6 projects beyond the lower end of the frame 1. In addition, the prime mover 7 is coupled to the subframe 1a at a position which is above the rotary wheel 6 and along a longitudinal axis passing substantially through the center of rotation of the rotary wheel 6 and substantially parallel to a longitudinal axis of the frame 1.

The accelerator operating portion 4, described above, is connected to the prime mover 7 so as to adjust or control the rotational speed of said prime mover 7 by operating the accelerator operation portion 4, while the brake operation portion 5 is coupled to a brake caliper 8 provided adjacent to the rotary wheel 6 for imparting a braking function to said rotary wheel 6 through the operation of said brake operation portion 5.

It should be noted here that, in the foregoing embodiment, although a gasoline engine is employed for the prime mover 7 with a gasoline tank 9 therefor being mounted on the frame 1, an electric motor may be employed for the prime mover 7 by substituting a battery for the gasoline tank 9. Furthermore, the rubber tire employed in the illustrated embodiment may be replaced by other equivalent means, such as an endless track, for example.

Similarly, in the embodiment illustrated, although the prime mover 7 and rotary wheel 6 are coupled to each other by the chain 11 through a sprocket gear 10, the coupling may be effected by any other suitable coupling arrangements.

The driving vehicle shown in the foregoing embodiment further includes a muffler 12 for silencing purpose mounted on the part of an exhaust passage and a cover 13 which covers the prime mover.

The state of operation of the one wheel driving vehicle having the construction as described above will be described hereinbelow.

In the first place, the player as indicated by the numeral 2 wears a pair of skates 14 as shown, which may be of various types, for example, skates or skate boards, etc. for effecting the present invention.

Figure 2:
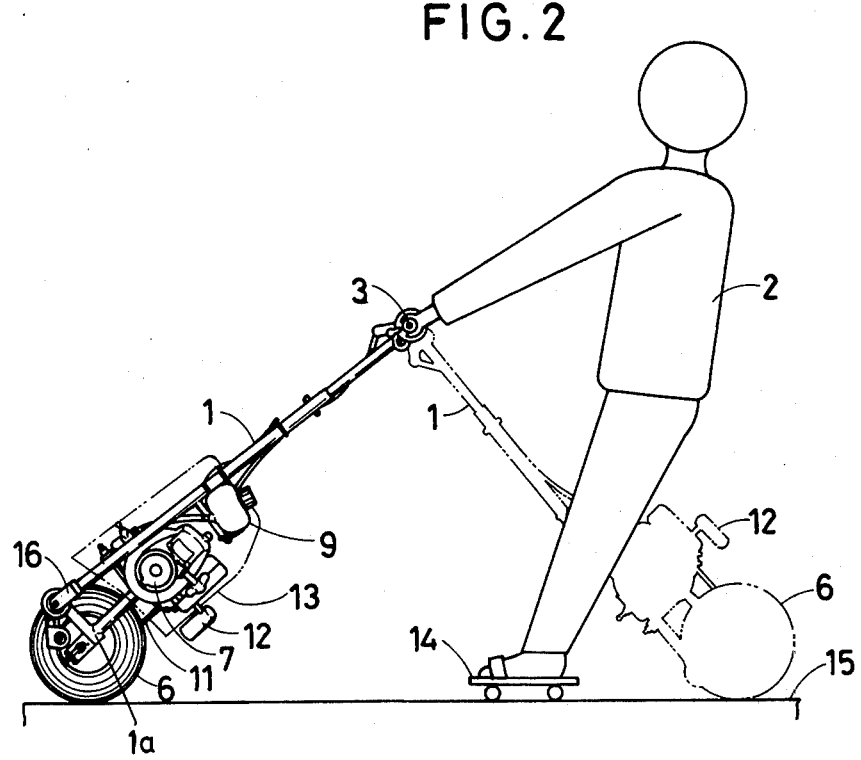
FIG. 2 is a side elevational view of the driving vehicle particularly showing the state of use thereof.

In the next step, the player 2 in the standing posture brings the rotary wheel 6 into contact with the ground surface 15, and grips the handle 3 to take an attitude to be drawn by the driving vehicle as shown in FIG. 2. Under the above state, upon operation of the prime mover 7, the rotary wheel 6 rolls over the ground surface 15, and as the player 2 is pulled thereby, the skates 14 run along the ground surface 15, and thus, the player 2 consequently can run together with the driving vehicle.

During the running, the direction of running may be changed by changing the orientation of the handle 3 and/or further by changing the posture of the player 2, etc., while it is also possible to adjust the running speed, for example, to 20 km or 40 km per hour, or to stop by controlling the accelerator operating portion 4 and brake operating portion 5.

It should be noted here that, although the foregoing description relates to the operating state wherein the player 2 is pulled by the driving vehcile, the operation may be so modified that the rotary wheel 6 is positioned at the rear of the player 2 as shown by the two-dot chain lines in FIG. 2.

In the position shown by the two-dot chain lines in FIG. 2, the driving vehicle is brought into a state such that the player 2 is pushed by merely changing the point of contact between the periphery of the wheel 6 and the ground surface 15.

In running in the above state, much vibration tends to be transmitted to the player 2 through the handle 3 due to the undulation or bumpiness of the ground surface 15 and vibration of the prime mover 7 itself; therefore, it is preferable to mount the prime mover 7 on the frame 1 through vibration absorbing means so as to prevent direct transmission of the vibration from the prime mover 7 to the frame 1. This can be done by providing a resilient vibration absorbing mechanism 16 between the frame 1 and the subframe 1a.

Figure 3:
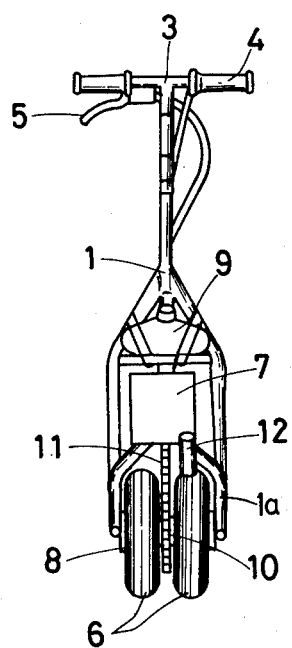
FIG. 3 is a rear elevational view of a driving vehicle employing a set of two wheels according to another embodiment of the present invention.

Referring further to FIG. 3, there is shown another embodiment of the driving vehicle according to the present invention, in which a set of two rotary wheels 6 are employed. In the similar manner to the first embodiment, the set of two rotary wheels 6 are also rotatably mounted on the lower end portion of the frame 1 as shown. In the above embodiment of FIG. 3, the prime mover 7 and the rotary wheels 6 are coupled to each other by the chain 11 through the sprocket gear 10, with said chain 11 being disposed in the portion intermediate between the two rotary wheels 6, but the state of the coupling therebetween may be modified in various ways. It is desirable, however, that the chain 11 is provided between the two rotary wheels 6 from the viewpoint of safety driving.

In the case that a set of two rotary wheels 6 are employed, contact area with the ground surface 15 is increased thus making it possible to run more stably.

As is clear from the foregoing description, the driving vehicle according to the present invention equipped with a prime mover for use in sports and games can provide various interesting states of use. For example, it enables the player wearing the skates to enjoy skating by operating said driving vehicle or several people to compare their skill or speed, etc. during skating.

It should be apparent to those skilled in the art that the above-disclosed embodiments are merely illustrative of but a few of the many possible specific embodiments which represent the applications of the principles of the present invention. Numerous and varied other arrangements can be readily devised by those skilled in the art without departing from the spirit and scope of the present invention.

I claim:

1. A driving device for pushing or pulling a roller skater which comprises:
    a longitudinally extending frame constituting a frame work:
    a handle provided at the upper end portion of said frame;
    a subframe coupled to a lower end portion of said frame and extending generally longitudinally therealong;
    a rotary wheel means rotatably coupled to said subframe; and
    a prime mover mounted on said subframe so as to drive said rotary wheel means, said rotary wheel means, subframe and prime mover being arranged and configured such that said wheel projects beyond said lower end of said frame and said prime mover is above said rotary wheel in the longitudinal direction of said frame whereby said driving device may push or pull a roller skater by merely changing the point of contact between a periphery of said rotary wheel and a ground surface.

2. A driving device as claimed in claim 1, wherein said rotary wheel means is a set of two wheels.

3. A driving device as claimed in claim 2, wherein said two wheels are provided with a chain movably disposed therebetween for connecting said prime mover with said two wheels.

4. A driving device as claimed in claim 1, wherein a vibration absorbing means is provided between said frame and subframe.

* * * * *